United States Patent Office 3,139,272
Patented June 30, 1964

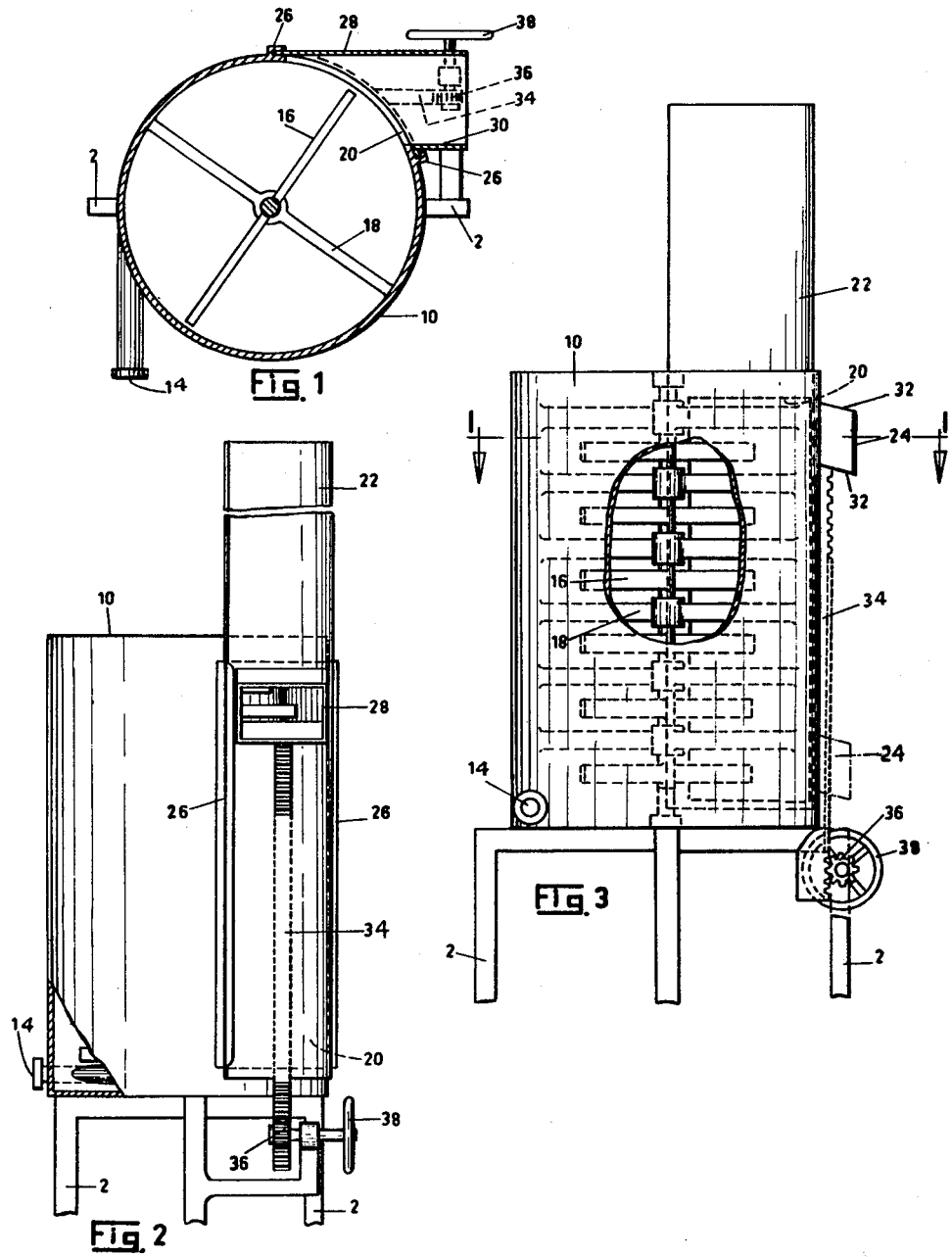

3,139,272
PRE-EXPANDER FOR PLASTIC PELLETS
UTILIZED IN FOAM MOLDING
Timothy Couchman, Clarkson, Ontario, Canada, assignor to David Bloom, Toronto, Ontario, Canada
Filed Mar. 2, 1962, Ser. No. 177,060
2 Claims. (Cl. 263—21)

This invention relates to a warming device for providing a constant supply of particulated materials which have been pre-warmed to a pre-determined temperature and for a predetermined length of time.

Warming mechanism of this type is frequently utilized in the art of plastic molding, particularly foam molding, wherein particulated plastic in pellet form is warmed as aforesaid for expanding the pellets to a preferred size prior to the actual molding operation; no contoural or dimensional limitations being intended by the term "pellet" as used herein.

In essence, the mechanism comprises a heating chamber with spaced inlet and outlet means and with means for moving the pellets from the inlet to the outlet means, preferably at a constant rate so as to control the quantum of heat absorbed by the pellets during their movement aforesaid; fresh material being constantly added through the inlet means.

For various reasons which it is not deemed necessary to enumerate herein it is of some importance at times that the pellets be expanded to a relatively uniform size and it is therefore of corresponding importance that they all receive substantially the same quantum of thermal exposure. Additionally, it is also deemed to be of some importance that the pellets be kept in a state of constant turbulence to prevent agglomeration, for example.

In order to attain these desiderata, the contemplated mechanism is equipped with means, such as agitator, for setting and maintaining said pellets in orbit and for simultaneously moving them from the inlet towards the outlet means; the intent being that the pellets will be then ejected through the outlet means by a centrifugal force.

It will thus be apparent that if, for any reason, the pellets are unable to be ejected or to escape from the outlet when and as they first reach it, they will be retained in said heating chamber for an overtime period and their thermal exposure—and consequent expansion—will continue which, of course, may prove undesirable in certain circumstances.

It is an object of the present invention to provide warming structure for producing pre-expanded pellets which are more conducive to successful foam molding.

It is another object of the invention to provide warming structure which will ensure better uniformity in the thermal exposure of the material to be heated.

Another object of the invention is to provide such structure with improved escape facilities for the pre-heated materials.

A further object of the invention is to provide an aforesaid structure with reduced opportunities for clogging of the outlet.

Yet another object of the invention is to provide a structure of the contemplated character wherein the possibility of agglomeration of the materials being heated is reduced.

A still further object of the invention is to provide structure capable of pre-warming and providing a constant supply of the contemplated materials in a satisfactory, smooth, and efficient manner.

It is a feature of the present invention that the outlet of the heating chamber is oriented to permit escape of the pellets in a stream whose direction is natural to the orbit of the pellets in the heating chamber. The pellets are thus allowed to escape from the chamber by following their natural escape path which, in practice, is essentially tangential to the orbit.

Further objects and characteristics of the invention will be in part obvious and in part specifically set forth in the hereinafter following description of the elements, parts, and principles constituting the invention; a preferred embodiment whereof is illustrated, by way of example only, in the drawing hereunto annexed wherein like reference devices refer to like parts of the invention and wherein:

FIG. 1 is a horizontal section of the pre-expander taken along the line 1—1 of FIG. 3, and as seen from the right hand side of FIG. 2, FIG. 2 is an elevation of the expander seen from the right side of FIG. 1, and, FIG. 3 is an elevation of the pre-expander seen from the side which is at the bottom of FIG. 1.

Referring now to the drawings, the pre-expanding devices constituted by a chamber 10 in which the pellets are heated and expanded while, at the same time, being moved therein in an orbit for reasons which will become apparent. In order to suitably accommodate the said orbit the chamber 10 should be in the shape of a body of revolution, preferably a cylinder as illustrated. A more satisfactory operation will generally result if the cylinder constituting chamber 10 is mounted in an upright position as shown in the drawing.

The chamber may be supported on a base 12 of any suitable construction. The chamber 10 is provided with heating means not shown which may be of any suitable nature such as for example a current of steam introduced into the chamber 10 as hereinafter described.

The plastic pellets to be heated may be introduced into the chamber 10 through a relatively restricted inlet duct 14 which opens into the chamber 10 at the bottom of the cylindrical wall of the chamber. The inlet duct 14 is preferably disposed in a substantially tangential direction with respect to the chamber so as to launch the pellets in their orbital movement forthwith upon their entry into the chamber 10.

The orbital movement of the pellets which may result from the tangentail orientation of the duct 14 is continued—or initiated as the case may be, by agitating or turbulating means of any suitable nature such as the present exemplary device comprised of a plurality of rotating blades 16 extending diametrically of the heating chamber 10 and mounted on a common shaft 15 which may be rotated by any suitable means (not shown).

The blades 16 are spaced from each other and alternate with fixed diametrically disposed blades 18 which serve to break up any agglomeration of pellets by providing a striking surface for the pellets.

The pellets are preferably introduced into the chamber 10 by entrainment in a gaseous current, which may be constituted by the steam used as a heating medium as aforesaid.

As the pellets are introduced into the chamber 10 through the duct 14 they begin to swell and become more buoyant. As they become more buoyant, they are carried gradually upwardly in the turbulence produced by blades 16 while being swirled in orbit around the chamber 10. The pellets are thus caused to rise progressively in the chamber 10 in a substantially constant manner until they reach the level of the chamber at which they find an outlet.

The pellets then exit through the outlet partly under the centrifugal force of their orbital movement and partly, upon being struck by the rotating blades 16 at the outlet level.

It will be obvious that the total heat to which the pellets herein are exposed—i.e. their "thermal exposure"—and, hence, their expansion will depend essentially upon two factors, namely; the interior temperature of the heating chamber and the travel time between the inlet and the outlet of the heating chamber 10. Assuming a constant temperature and rate of speed, the thermal exposure of the pellets can be, and is in practice, varied by varying the distance between the inlet and outlet of heating chamber 10 to increase or decrease the length of time that the pellets take in travelling from one to the other.

In practice the expansion of the pellets may need to be adjusted from time to time for different applications. Thus, in reliance upon a constant heat source for the chamber 10, such expansion is best controlled by the time spent by the pellets in the chamber and consequently by the level at which the pellets are removed from the chamber. The outlet for the pellets herein is therefore rendered adjustable in level with respect to the inlet, thus increasing or decreasing the time that the pellets spend in the chamber 10, their thermal exposure and, accordingly, their expansion.

The structure in accordance with the present embodiment of the invention which fulfils the above requirements is constituted by an elongated opening 20 in the wall of chamber 10, which opening is closed off by a closure 22 provided with an intermediate outlet chute 24 for the expanded pellets.

The opening is angularly displaced from the inlet 14 and extends along the wall of chamber 10 and is spaced a short distance from the top and bottom of chamber 10.

The closure 22 is curved to the same curvature as the cylindrical wall of chamber 10 and is slidably mounted in a pair of rails 26 disposed along the vertical sides of the opening 20. The closure 22 should be of sufficient length to close off the opening 20 in all positions in which the chute 24 communicates with the interior of chamber 10 through opening 20.

In accordance with the invention the removal of pellets from the chamber 10 is effected in a stream directed along the natural escape path of the pellets, namely, substantially tangential to the orbit of pellets in chamber 10, which presents the least obstruction thereto and so prevents pellets from accumulating in the outlet chute; which accumulation may hamper free escape of the pellets and introduce variations in their thermal exposure. For this reason the chute 24 is disposed with its axis substantially tangential to the orbit in which the pellets move in chamber 10. More specifically the chute 24 has its outer wall 28 tangential to the cylindrical wall of chamber 10 at its point of contact therewith and its inner wall 30 is preferably substantially parallel to its said outer wall 28. This disposition of the chute 24 enables the pellets to fly off the orbit through the chute 24 without striking the chute walls at steep angles, so that the pellets do not accumulate in the chute.

The top and bottom walls 32—32 of the chute 24 are preferably slightly inclined downwardly to compensate for the gravitational trajectory of the pellets.

The adjustment of the chute level is effected by any suitable means, such as, for example, a rack 34 secured to chute 24 and to the closure 22 and operated through the agency of a pinion 36 by a handwheel 38.

It will be understood that the invention is not necessarily limited to the pre-expansion of foamable pellets but, is applicable in any instance where similar problems arise.

The foregoing description is intended to be merely illustrative of the present inventive idea in relation to the particular embodiment selected for this purpose. Accordingly, the true scope of the invention is to be limited only to the extent which would be apparent from the claims hereinafter following.

What I claim is:

1. A warming device for comminuted thermally expandable materials comprising,
    a generally cylindrical and upright heating chamber having an elongated outlet opening extending between the top and bottom thereof,
    material inlet facilities for said chamber near the bottom thereof;
    an agitator for moving said materials in orbit in said chamber;
    an outlet duct movable along said outlet opening in communication with said chamber, said outlet duct being substantially tangential to said chamber to provide escape of said material from said orbit in a stream substantially tangential to said orbit; and
    means carried by said duct and movable therewith for closing said opening above and below said outlet duct.

2. A warming device for comminuted thermally expandable materials comprising,
    a generally cylindrical and upright heating chamber having an elongated outlet opening extending between its top and bottom,
    material inlet facilities for said chamber near the bottom thereof;
    an agitator for moving said materials in orbit in said chamber;
    a closure movable along said opening;
    an outlet duct provided on and co-movable with said closure and communicating with said chamber therethrough, said outlet duct being movable by said closure in a plane substantially tangential to said chamber to provide for escape of said material from said orbit in a stream substantially tangential to said orbit; and
    means to move said closure over said opening to vary the location of said duct between the top and bottom of said chamber, said closure being dimensioned to cover said opening irrespective of the position of said duct.

References Cited in the file of this patent

UNITED STATES PATENTS

| 792,667 | Rogers | June 20, 1905 |
| 918,834 | Fairall | Apr. 20, 1909 |
| 2,824,723 | Turney et al. | Feb. 25, 1958 |
| 2,997,286 | Friese | Aug. 22, 1961 |

FOREIGN PATENTS

| 457,541 | Great Britain | Nov. 30, 1936 |